(12) United States Patent
Collins

(10) Patent No.: US 8,784,011 B2
(45) Date of Patent: Jul. 22, 2014

(54) MARINE-EQUIPMENT INSTALLATION METHOD AND APPARATUS

(75) Inventor: Patrick Collins, Ellon (GB)

(73) Assignee: Aubin Limited, Ellon (GB)

( * ) Notice: Subject to any disclaimer, the term of this patent is extended or adjusted under 35 U.S.C. 154(b) by 6 days.

(21) Appl. No.: 13/229,920

(22) Filed: Sep. 12, 2011

(65) Prior Publication Data

US 2012/0063850 A1 Mar. 15, 2012

(30) Foreign Application Priority Data

Sep. 13, 2010 (GB) .................................... 1015218

(51) Int. Cl.
E02D 23/02 (2006.01)
E02B 17/02 (2006.01)

(52) U.S. Cl.
CPC ........................................ E02B 17/02 (2013.01)
USPC ............................................................ 405/205

(58) Field of Classification Search
USPC .................................. 405/230, 204, 205, 224
See application file for complete search history.

(56) References Cited

U.S. PATENT DOCUMENTS

| | | | | | |
|---|---|---|---|---|---|
| 3,550,385 | A | * | 12/1970 | Hill et al. ....................... | 405/205 |
| 4,181,453 | A | * | 1/1980 | Vache ............................ | 405/203 |
| 4,310,052 | A | * | 1/1982 | Rivertz ......................... | 166/351 |
| 4,555,201 | A | * | 11/1985 | Paoluccio ..................... | 405/117 |
| 4,690,586 | A | * | 9/1987 | Oksuzler ....................... | 405/209 |
| 5,439,321 | A | * | 8/1995 | Hunter ....................... | 405/195.1 |
| 5,636,943 | A | * | 6/1997 | Haney ....................... | 405/195.1 |
| 5,899,637 | A | * | 5/1999 | Blanchard et al. ............ | 405/210 |
| 5,997,218 | A | * | 12/1999 | Børseth ...................... | 405/223.1 |
| 6,007,275 | A | * | 12/1999 | Børseth ......................... | 405/224 |
| 6,106,198 | A | * | 8/2000 | Børseth ...................... | 405/223.1 |
| 6,113,314 | A | * | 9/2000 | Campbell ....................... | 405/224 |
| 6,132,143 | A | * | 10/2000 | Hovinga et al. ............... | 405/206 |
| 6,135,673 | A | * | 10/2000 | Horton et al. ................. | 405/205 |
| 6,196,767 | B1 | * | 3/2001 | Thomas ........................ | 405/203 |
| 6,241,425 | B1 | * | 6/2001 | Kazim .......................... | 405/200 |
| 6,406,222 | B1 | * | 6/2002 | Pollack .......................... | 405/224 |
| 6,547,491 | B1 | * | 4/2003 | Haney ........................ | 405/195.1 |
| 7,887,261 | B2 | * | 2/2011 | Stubler et al. ................. | 405/209 |
| 2009/0255454 | A1 | * | 10/2009 | Soe-Jensen ................... | 114/121 |
| 2011/0074155 | A1 | * | 3/2011 | Scholte-Wassink ........... | 290/44 |
| 2011/0164926 | A1 | * | 7/2011 | Joensen et al. ................ | 405/205 |
| 2011/0206465 | A1 | * | 8/2011 | Howard et al. ............... | 405/205 |
| 2011/0241347 | A1 | * | 10/2011 | Boureau et al. ................. | 290/53 |
| 2011/0305518 | A1 | * | 12/2011 | Pearce et al. ..................... | 405/75 |
| 2011/0305521 | A1 | * | 12/2011 | Henstra et al. ................ | 405/198 |

FOREIGN PATENT DOCUMENTS

| | | | | |
|---|---|---|---|---|
| EP | 1 867 564 | * | 12/2007 | ............... B63C 7/10 |
| EP | 1867564 | A1 | 12/2007 | |
| FR | 1478520 | A | 4/1967 | |
| GB | 1596400 | A | 8/1981 | |
| GB | 2455246 | A | 6/2009 | |

* cited by examiner

*Primary Examiner* — Frederick L Lagman
*Assistant Examiner* — Patrick Lambe
(74) *Attorney, Agent, or Firm* — Winstead PC

(57) ABSTRACT

A method of installing marine equipment, the method including providing a marine apparatus comprising the marine equipment and a buoyancy device including at least a first and a second tank. The first tank containing air and the second tank containing a buoyant liquid having a specific gravity of less than 0.8 g/cm$^3$. The method including providing a template on the seabed and guiding the marine apparatus down onto the template. Also a buoyancy device comprising at least a first and a second tank, the first tank containing a first fluid and the second tank containing a second fluid.

13 Claims, 7 Drawing Sheets

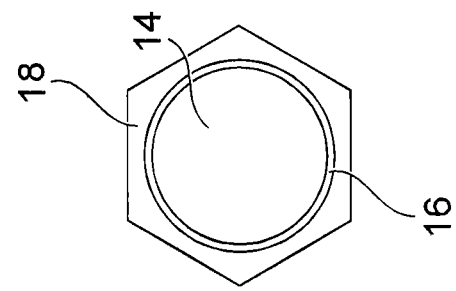
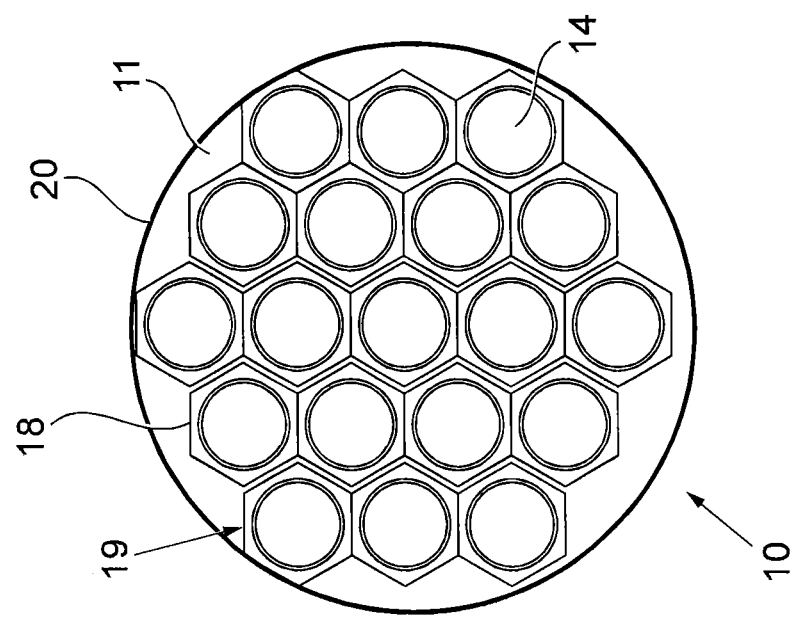

MARINE-EQUIPMENT INSTALLATION METHOD AND APPARATUS

The present invention relates to a method of installing marine equipment, especially offshore wind turbines.

The cost of installation in the sea is a significant element in the total cost of an offshore wind farm. Current techniques for field installation of wind farms offshore essentially replicate those onshore. Most wind turbines are installed on monopiles, essentially large diameter tubes that have been driven into the seabed, the wind turbine is then installed onto these monopiles. This approach is effective up to seawater depths of fifteen meters. At greater depths different structures are employed. Generally these are of a jacket or tripod design which are secured to the sea bed by piles.

In order to construct the wind turbine on its base, a specialist jack up vessel is employed and the components of the wind turbine (base and turbine) are carried out to the site separately. The wind turbine is then constructed on site. This is a difficult and hazardous procedure since it involves moving and raising large heavy items (typically 200 to 400 metric tonnes) to heights typically in excess of 70 meters above the sea's surface. This necessarily requires the use of large cranes which are expensive to hire and can only operate at low wind speeds and tranquil wave conditions.

As a consequence it is commonplace to construct the foundations of a wind farm in one year and install the turbines in the next year. The combined cost of the installation vessels and waiting on weather adversely impacts the overall economics of the offshore wind farm.

An additional concern is that since the turbines have a large number of moving parts there is an ongoing requirement for maintenance. This may require the replacement of very large elements of the turbine such as gearboxes or generator units. Currently this may require mobilising installation barges incurring substantial costs.

The inventor of the present invention has recognised that it would be advantageous if a wind turbine could be more fully constructed onshore, transported to a site offshore, and installed as one single element.

The inventor of the present invention has also recognised that the deployment of the turbine bases underwater is difficult to control even with the provision of extremely robust tanks to withstand the increased water pressure at depth.

According to a first aspect of the invention there is provided a method of installing marine equipment, the method comprising:
  (a) providing a marine apparatus comprising the marine equipment and a buoyancy device including at least a first and a second tank, the first tank containing air and the second tank containing a buoyant liquid having a specific gravity of less than 0.8 g/cm$^3$;
  (b) providing a template on the seabed;
  (c) placing the marine apparatus in water, such that it floats;
  (d) providing one or more flexible elongate members on the marine apparatus and attaching the one or more flexible elongate members to the template;
  (e) removing a portion of the buoyant liquid from the second tank, such that the marine apparatus is less buoyant; and
  (f) guiding the marine apparatus down onto the template using the flexible elongate members.

Thus the invention provides a method to controllably deploy marine equipment—the buoyant liquid providing essentially incompressible buoyancy that does not vary in volume and buoyancy with changing depth.

Method step (e) may be repeated immediately after step (f).

The first tank may be inside the second tank. The contents of the first and second tanks may be isolated from one another.

The buoyancy of the marine apparatus may be adjusted by controlling the amount of buoyant liquid in the second tank. The buoyancy of the marine apparatus may be controlled such that the marine apparatus has just enough buoyancy to keep the one or more flexible elongate members taught, but not so much buoyancy that an excessive upward force is applied to the flexible members.

The one or more flexible elongate members and template afford a means of guiding the marine apparatus down into place on the seabed. Guiding the marine apparatus may include pulling the marine apparatus down onto the template using the flexible elongate members. An advantage of this method of installing marine equipment is that whilst it is difficult to accurately position marine equipment, for example an offshore wind turbine, at a particular site, it is relatively easy to position a template. Using existing methods of deployment, the marine equipment must be provided with enough buoyancy so that it floats above the template. The one or more flexible elongate members may be wire(s). A winch may be used to pull on a wire attached to the marine apparatus and template, to pull the marine apparatus down onto the template. It is therefore necessary for the winch to pull on the wire with enough force to overcome the buoyancy required to make the marine apparatus float.

Using the method of the present invention the buoyancy of the marine apparatus is adjusted so that the marine apparatus is just buoyant or neutrally buoyant. This significantly reduces the upward force acting on wire that the winch has to pull against, thereby reducing the weight, size, cost and complexity of the winch required. Also, since the upward force acting on the wire is reduced, the method of the present invention provides a safer method of installing marine equipment because if the wire breaks when the marine apparatus is between the surface and the template, the upward force acting on the wire at that moment, would only be enough to keep the one or more wires taught. If the wire breaks, the volume of buoyant liquid can be adjusted to prevent the marine apparatus from accelerating uncontrollably toward the surface, potentially damaging other equipment and endangering lives.

The winch may be attached to the template or mounted on a vessel on the surface or mounted on the marine apparatus, the template having one or more pulleys through which the one or more wires pass.

The air in the first tank may provide the majority of the buoyancy, typically between 70 and 90%. This is not typically enough to float the marine apparatus on the surface. The buoyant liquid in the second tank may provide the additional buoyancy required to float the marine apparatus. The air provides passive buoyancy whilst the buoyant liquid provides additional buoyancy and an element of buoyancy control.

The template is used to secure the subsea equipment and subsea apparatus to the seabed in the desired location and in the desired orientation. The template is typically installed at the desired site on the sea bed and in the desired orientation, and the marine equipment is then fixed in a set manner to the template, which fixes the position and orientation of the marine equipment. The size of the template depends on the size of the marine apparatus to be attached to the template. The template is normally made of steel. The template typically includes a base plate that rests on the seabed and is perpendicular to the seabed in use. The template may have uprights that engage with the marine equipment to guide it into a fixed connection with the template. The template typically provides a foundation for the marine equipment. The template may be secured to the seabed by one or more of piles driven into the seabed, suction anchors, and heavy weights.

Guiding the marine apparatus down onto the template using the flexible elongate members may be used to temporarily or permanently fix the marine equipment to the template.

The method of installing marine equipment may further include the step of removing and/or recovering the buoyant liquid from the second tank to surface where it can be reused.

The buoyant liquid may be removed from the second tank by displacing and replacing it with water thus causing the marine apparatus to sink as it becomes less buoyant, making it easier to guide down the marine apparatus towards the template. On the seabed the marine equipment can be kept in place using ballast or by displacing the air in the first tank with water or with a fluid with a density greater than seawater, such as a high density water based drilling fluid.

Steps of the method may be repeated until the marine apparatus is positioned on the seabed. Indeed the method is especially advantageous because a small amount of buoyant liquid can be removed from the second tank, causing the marine apparatus to sink whereupon buoyant fluid can be added to slow or even stop the rate of descent by making the marine apparatus neutrally buoyant. This provides good controllability of the position of the marine apparatus and so also the marine equipment. Increased sensitivity of buoyancy control greatly improves the accuracy and safety of the installation of marine structures.

Typically, before the buoyant liquid is removed, the forces acting on the marine apparatus are balanced such that it floats—the combination of the buoyant liquid and the air providing upward force and the weight of the marine apparatus and the wire, winch and template if attached to the marine apparatus provide a downward force.

The marine equipment can be recovered from the seabed by reversing this operation.

Optionally the buoyancy device and first and second tanks are separable from the marine equipment. The method typically includes attaching the buoyancy device to the marine equipment to form the marine apparatus. Alternatively the buoyancy device may be incorporated as part of the marine equipment.

Optionally the marine equipment and buoyancy device are attached before the marine apparatus is placed in the water. Indeed, optionally they are attached onshore and then transported offshore.

To transport the marine apparatus offshore, the method may include first placing the marine apparatus onto a vessel and then moving the vessel to a place proximate to a site where the marine equipment is to be installed. The vessel may be a barge.

To float the marine apparatus, the vessel may be sunk and typically recovered thereafter. Thus such embodiments benefit in that no cranes are required to move the marine apparatus into the water.

Optionally when the marine apparatus is placed in the water, air in the first tank and buoyant liquid in the second tank is sufficient to maintain the marine apparatus in a floating position.

An advantage of certain embodiments is that the buoyant liquid when not in the water, acts as a weight to lower the centre of gravity of the marine apparatus, thus making it more stable during transport, especially on a vessel.

Steps (a), (b), (c), (d), (e) and (f) may be conducted in any order, although normally in the sequence (a) to (f).

Typically the buoyancy device is removed after the marine equipment has sunk to the intended position. Optionally the buoyancy device can then be reused.

Alternatively, it may be preferable to leave the buoyancy device in place wherein the liquid can be pumped out to a vessel and the buoyancy device used to secure the marine equipment to the seabed by for instance by filling the buoyancy device with ballast.

Embodiments of the present invention provide benefits over the use of gas as a buoyant medium. The inventor of the present invention notes that gas is first lost (e.g. bled off) from an apparatus being sunk to reduce its buoyancy. More complicated facilities have to be provided to replenish the gas where buoyancy needs to be controlled, or regained. Moreover, once the apparatus sinks, the air will compress under the increased pressure of the water (which increases with depth) and so the buoyancy will be reduced further due to the decreased volume of gas. The consequential reduced buoyancy will cause the apparatus to sink further with a further compression of the gas by the further increased water pressure at the greater depth and consequential reduction in buoyancy causing the apparatus to sink further again and so on.

The first tank containing air may be strengthened to ensure it is rigid at depth. This adds to the mass of the structure.

Typically when a portion of the buoyant liquid of the present invention is removed the buoyancy of the marine apparatus is reduced slightly. The buoyancy is reduced until only a comparatively small amount of downward force or pull is required to move the marine apparatus compared to the pull required to move the marine apparatus with enough buoyancy to make it float. During transit of the marine apparatus from the surface of the sea to the point of installation on the template, the wires may be constantly tensioned by the buoyant force of the buoyant liquid, ensuring that the installation process is fully controlled and less reliant on the surface sea state.

The marine apparatus may sink at a rate proportional to the rate of removal of buoyant liquid. Thus very close control of the vertical height of the marine apparatus in the water is afforded. The marine apparatus can be raised again by pumping buoyant liquid into the buoyancy device.

Thus in marked contrast to the use of gas only, the buoyant liquid of the present invention is essentially incompressible. Thus the volume of the buoyant liquid is unaffected by the water pressure and so the sequence of—sinking—volume reduction—buoyancy reduction—further sinking—further volume reduction—etc does not occur with the buoyant liquid of the present invention.

Whilst some disadvantages of the use of air can be mitigated by the use of robust tanks, such tanks would also add more weight to the overall system requiring more buoyancy, and still suffer from the volume variance disadvantages (and others) when valves were opened and closed to control the buoyancy. Moreover, as depth increases the amount of gas to be added for buoyancy is much more, because it is compressed, impacting the difficulty of using such a system and also making it more expensive. Accordingly the sinking can be much more controlled, and smoother—an important consideration when launching such a large and expensive structure, with a carefully intended position.

Moreover as the buoyant liquid of the present invention is removed from the buoyancy device to a separate receptacle it is not lost and can easily be returned to control the buoyancy.

Optionally the second tank has an opening at the top and an opening at the bottom controlled by valves. To move the buoyant liquid, the top and bottom openings may be opened and the buoyant liquid displaced out of the buoyancy device and into a separate receptacle through the action of hydrostatic pressure. In this way the descent of the structure can be controlled by opening and closing the top opening in communication with the buoyant liquid. The buoyant liquid may nonetheless be pumped directly out of the second tank, or water pumped into the second tank to displace the buoyant liquid.

Optionally the buoyant liquid is immiscible with water such that it will not be contaminated.

The marine apparatus, especially the buoyancy device, may also comprise a pump, although for certain embodiments the pump may be a separate piece of equipment.

The marine equipment is often a wind turbine. However the method may also be used for other structures such as tidal turbines, wave machines and the construction and removal of offshore oil platforms.

The buoyant liquid may be diesel, methanol or more optionally a fluid, either a base oil or water containing a quantity of glass microspheres, optionally sufficient to lower the density of the fluid to that approaching 475 kg per cubic meter at room temperature.

Thus the buoyant liquid may comprise a liquid and a plurality of rigid containers, the rigid containers each having a sealed void containing a gas or indeed a vacuum.

Optionally the buoyant liquid has a specific gravity of less than 0.78 g/cm$^3$, more optionally less than 0.70 g/cm$^3$, even more optionally less than 0.65 g/cm$^3$, especially less than below 0.60 g/cm$^3$, and typically less than 0.55 g/cm$^3$.

The rigid containers may be between 5 microns and 5 mm in diameter, optionally between 10 microns and 500 micron in diameter and more optionally between 20 micron and 200 micron in diameter.

"Rigid" in this context means that the rigid containers are incompressible at the pressures found in underwater environments.

Optionally the rigid containers are microspheres.

The buoyant liquid may comprise an oil (optionally low toxicity) such as a hydrocarbon, an aliphatic oil, poly alpha olefin, alkyl ester or vegetable oil that is a triglyceride such as one having the structure:

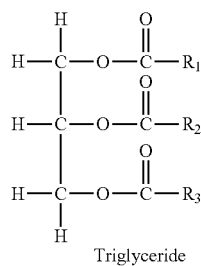

Triglyceride where $R_1$, $R_2$, and $R_3$ are hydrocarbon chains typically with a chain length of between $C_{12}$ and $C_{22}$ to give a range of fatty acids and between zero to three double bonds in the hydrocarbon chain.

Most typically such materials are derived from nature as vegetable oils although synthetic alternatives may be made.

Optionally the oil is biodegradable. Thus for certain embodiments of the invention, the inherent environmental risk that some liquid therein may leak is not a significant concern because biodegradable oils may be used, such as vegetable oil, which would not be a concern to wildlife in the unlikely event of a leak.

The liquid may also comprise a viscosifying agent such as organophilic clay, dispersed silica, long chain polymeric materials, surfactants or mixtures of the aforesaid agents.

Optionally the buoyant liquid exhibits viscoelastic and/or thixotropic rheological properties.

At a temperature of 20° C. and a low shear rate of 30 rpm, the viscosity, as measured on a Fann Rheometer type viscometer of the buoyant liquid can be between 200 and 10,000 centipoise, optionally between 500 and 2000 centipoise, more optionally between 650 and 1000 centipoise.

At a temperature of 20° C. and a high shear rate of 300 rpm, the viscosity as measured on a Fann Rheometer type viscometer of the buoyant liquid can be between 100 and 1,000 centipoise, optionally between 100 and 500 centipoise, particularly between 150 and 300 centipoise.

According to a second aspect of the present invention, there is provided a buoyancy device, the device comprising at least a first and a second tank, the first tank being inside the second tank, the first tank containing a first fluid and the second tank containing a second fluid, wherein the second fluid surrounds the first tank, the first and second fluids being isolated from one another, and wherein the second tank has at least one port providing fluid communication with the second tank.

The first and second fluids may be the same or may be different. The first fluid may be air or nitrogen or another gas. The second fluid may be a liquid. The liquid may be a buoyant liquid and may have a specific gravity of less than 0.8 g/cm$^3$. The buoyant liquid may be an essentially incompressible liquid.

The buoyant liquid may have a density of between 500 and 700 kgs/m$^3$. Optionally the buoyant liquid has a specific gravity of less than 0.78 g/cm$^3$, more optionally less than 0.70 g/cm$^3$, even more optionally less than 0.65 g/cm$^3$, especially less than below 0.60 g/cm$^3$, and typically less than 0.55 g/cm$^3$.

There may be more than one first tank and normally at least 10 and optionally at least 15.

The first fluid may be sealed into the first tank. The second fluid may be added to and removed from the second tank in use. The second fluid may be removed from the second tank by displacing it via the port with water, air or another fluid with a density greater than seawater, such as a high density water based drilling fluid.

The first fluid may provide passive buoyancy and the second fluid may provide active or adjustable buoyancy. The second fluid may be removed from the second tank to reduce the overall buoyancy provided by the device.

The second tank may have a second port providing further fluid communication with the second tank.

The first and second tanks may be tubular. The first tank may be sealed at both ends. The first fluid inside the first tank may be pressurised. The pressure of the first fluid inside the first tank may be between 3 and 7 bar and it may be between 8 and 12 bar.

When the buoyancy device comprises more than one first tank, the first tanks may be held together at one or more bulkheads. The one or more bulkheads may be secured to the first tanks at regular intervals along their length.

The second tank may have an outer wall of steel or high density polyethylene or fabric.

The buoyancy device may have a volume of between 100 and 1,000 m$^3$, optionally between 1,001 and 5,000 m$^3$ and more optionally 5,001 and 10,000 m$^3$.

The buoyancy device according to the second aspect of the present invention may be the buoyancy device according to the first aspect of the present invention.

Embodiments of the present invention will now be described, by way of example only, with reference to the accompanying figures, in which:

FIG. 7a is a cross-section of the buoyancy device through line A-B labelled on FIG. 6; and FIG. 7b is a cross-section of one of the tubes of the buoyancy device shown in FIGS. 6 and 7a.

Figure 1:
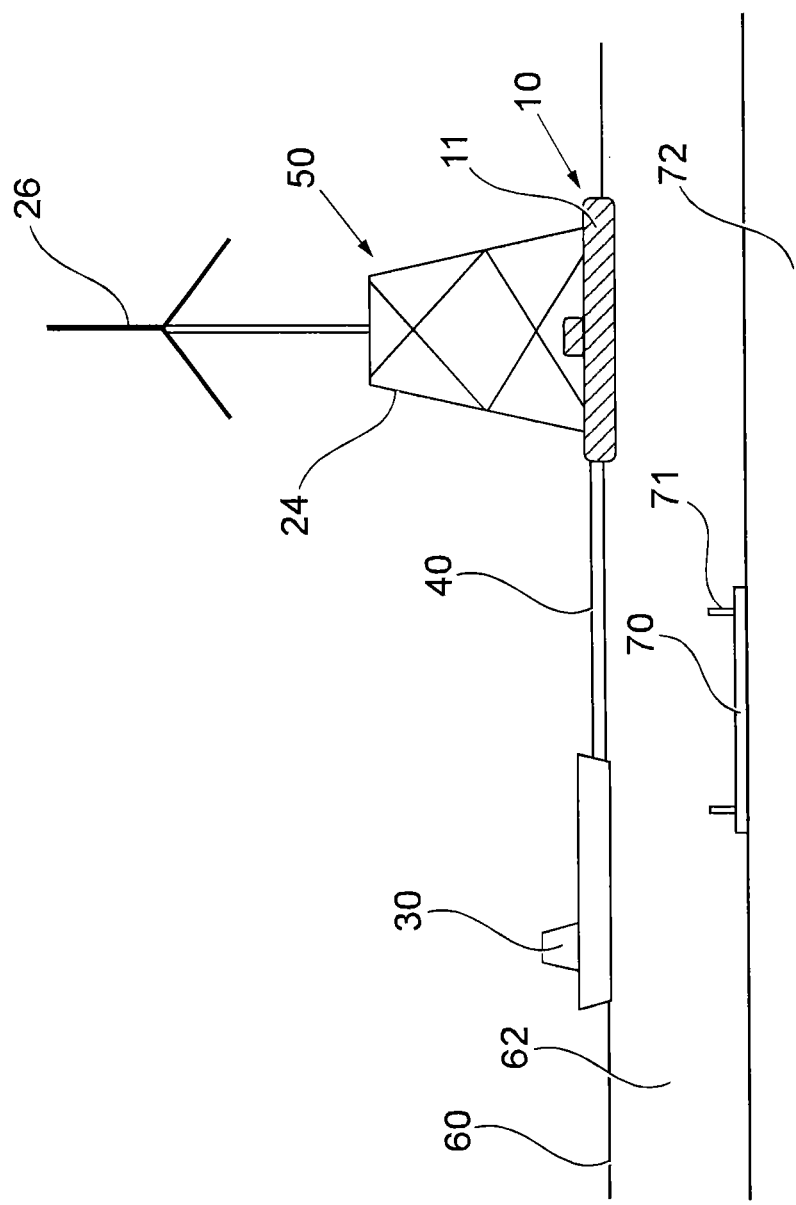
FIG. 1 is a front view of a turbine apparatus according to the present invention, the turbine apparatus in a floating position.

One embodiment of the method of installing marine equipment is shown in FIGS. 1 to 5. FIG. 1 shows a turbine apparatus 50 comprising a platform 24 and a wind turbine 26. A buoyancy device 10 is attached to the base of the platform 24. The buoyancy device 10 and turbine apparatus 50 together are the marine equipment.

The buoyancy device 10 contains air in sealed tubes (shown in FIGS. 6, 7a and 7b but not in FIGS. 1 to 5) and buoyant liquid 11. The air provides passive buoyancy and the buoyant liquid provides active or adjustable buoyancy.

The buoyant liquid is used to stabilise the turbine apparatus 50 during transportation to an offshore installation site. The buoyant liquid above the surface of the sea 60 is effectively weight that holds the turbine apparatus 50 on the surface of the sea 60. The combined centre of gravity of the turbine apparatus and buoyant liquid is close to the surface of the sea 60. The buoyant liquid below the surface of the sea 60 and in the water 62, provides buoyancy to the turbine apparatus, not weight.

It should be noted that the process of sinking and recovering an offshore installation is conventionally very difficult. However for embodiments of the present invention, as the installation sinks, the buoyant liquid in buoyancy device 10 attached to the turbine apparatus 50 or installation sinks below the surface of the water 60 and provides buoyancy to the turbine apparatus 50, thereby providing additional control in the sinking process.

Prior to taking the turbine apparatus to an installation site, a template 70 is placed on the seabed 72 in the desired location and piled into position. The template 70 is a base assembly with upright fixtures 71 onto which the turbine apparatus 50 is to be attached. The template 70 is placed on the seabed 72 with a crane (not shown). It may be placed in the seabed 72 using a buoyancy device 10 such as that described above.

With the turbine apparatus 50 ready to be installed on the seabed 72, cable 40 is attached to the turbine apparatus 50 and a vessel 30 that tows the turbine apparatus 50 to the offshore installation site shown in FIG. 1.

Figure 2:
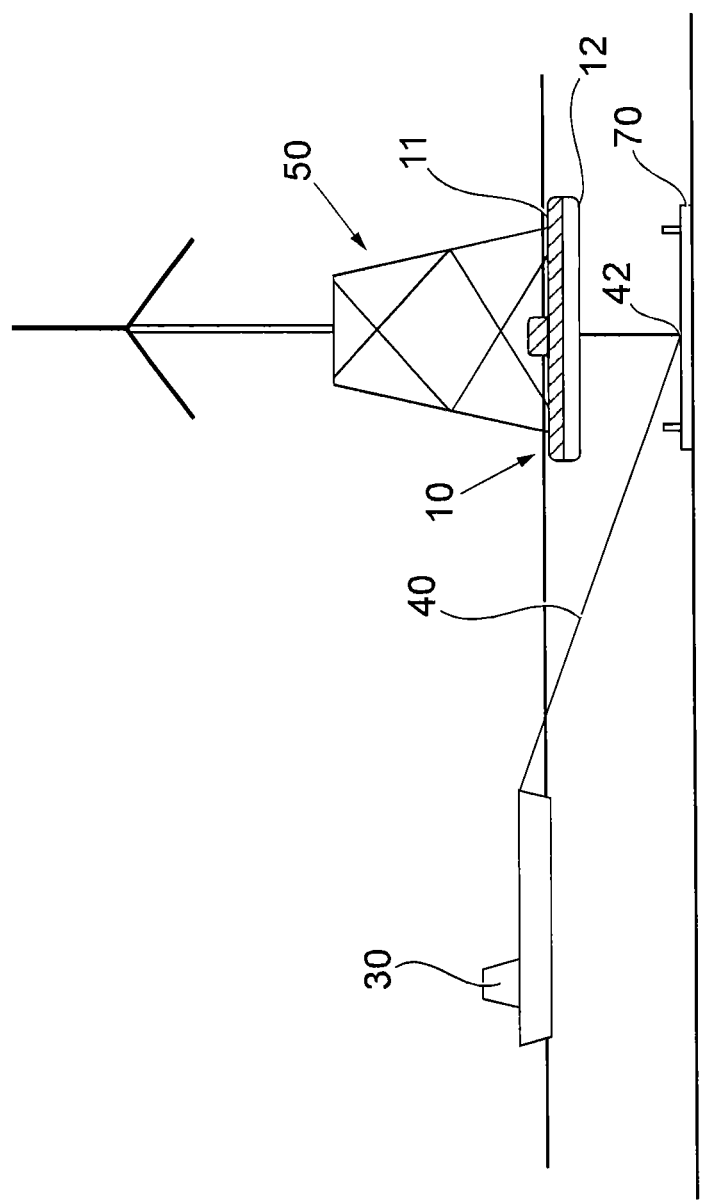
FIG. 2 is a front view of the turbine apparatus in a floating position above a template.

FIGS. 1 to 5 illustrate the installation process whereby the turbine apparatus 50 is placed on the seabed 72. At a suitable time, once the turbine apparatus 50 is at the desired location, the cable 40 is passed through a pulley 42 attached to the template 70 and attached to the turbine apparatus 50, as depicted in FIG. 2.

Figure 6:
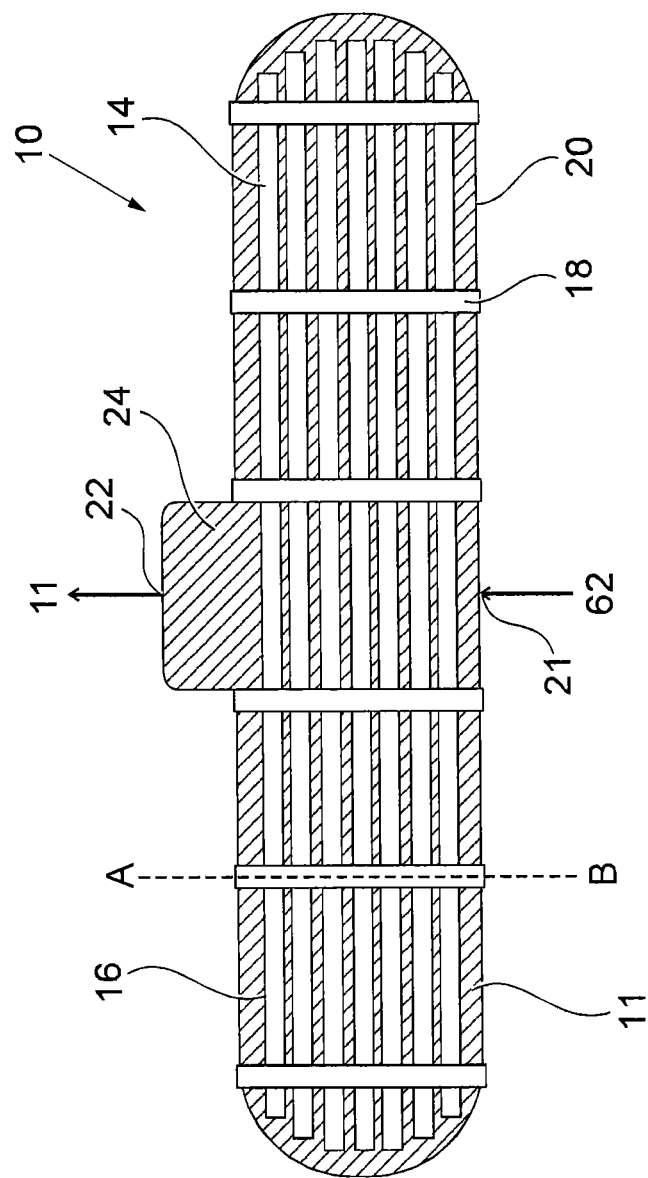
FIG. 6 is a cross-section of a buoyancy device according to the present invention.

Buoyant liquid 11 is removed from the buoyancy device 10 to reduce the buoyancy acting on the turbine apparatus 50, but not enough buoyant liquid 11 is removed to allow the turbine apparatus 50 to sink completely. Openings in the base and top of the buoyancy device 10 provide fluid communication between the buoyancy device 10 and outside (as shown in FIG. 6). Seawater 12 is pumped into the buoyancy device 10 to displace the buoyant liquid 11 and reduce the buoyant force acting on the turbine apparatus 50. Displacing the buoyant liquid 11 reduces the buoyancy of the turbine apparatus 50 causing it to sink slowly in a controlled manner.

Figure 3:
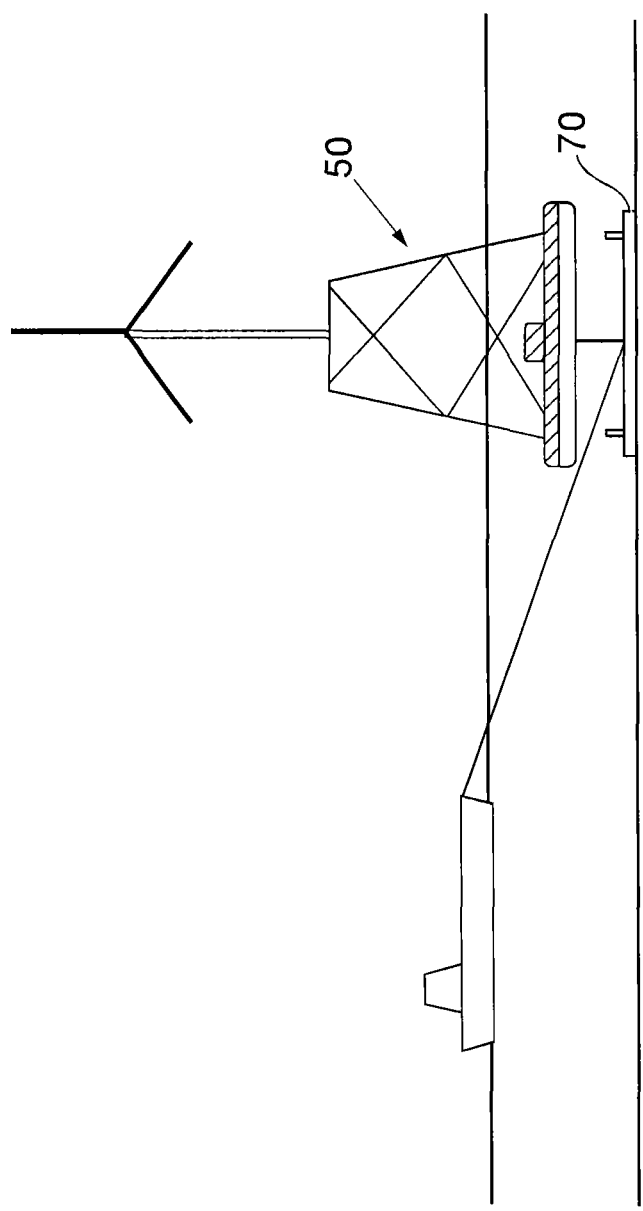
FIG. 3 is a front view of a turbine apparatus being guided down onto the template.
Figure 4:
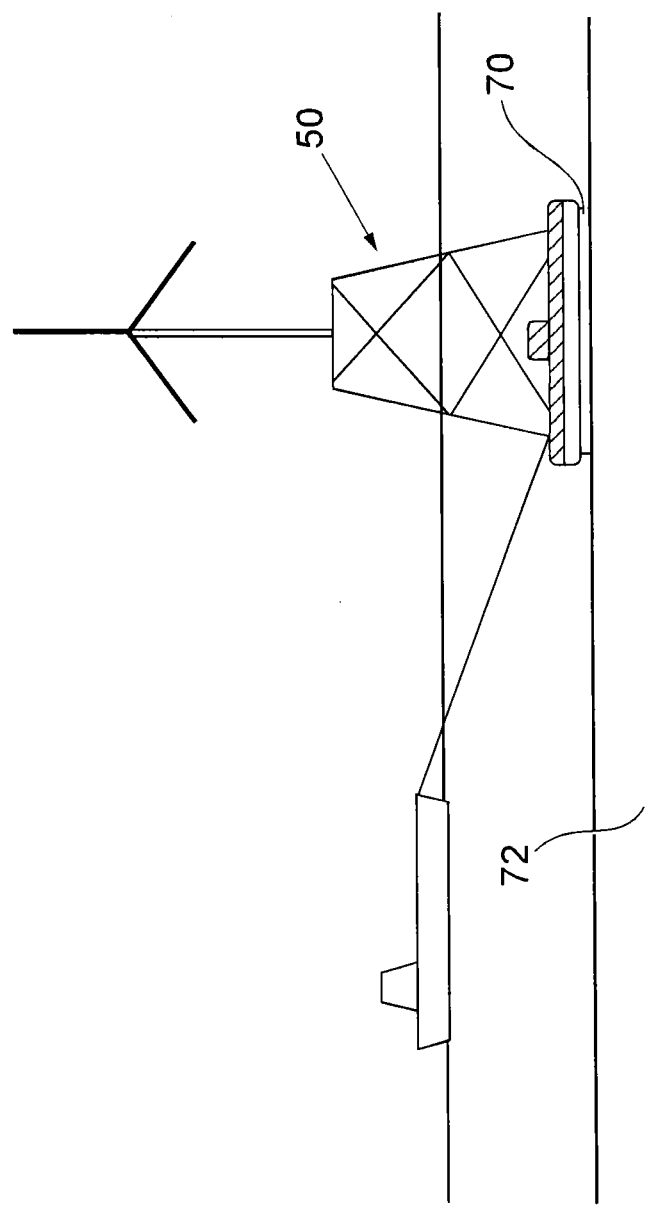
FIG. 4 is a front view of a turbine apparatus attached to the template.
Figure 5:
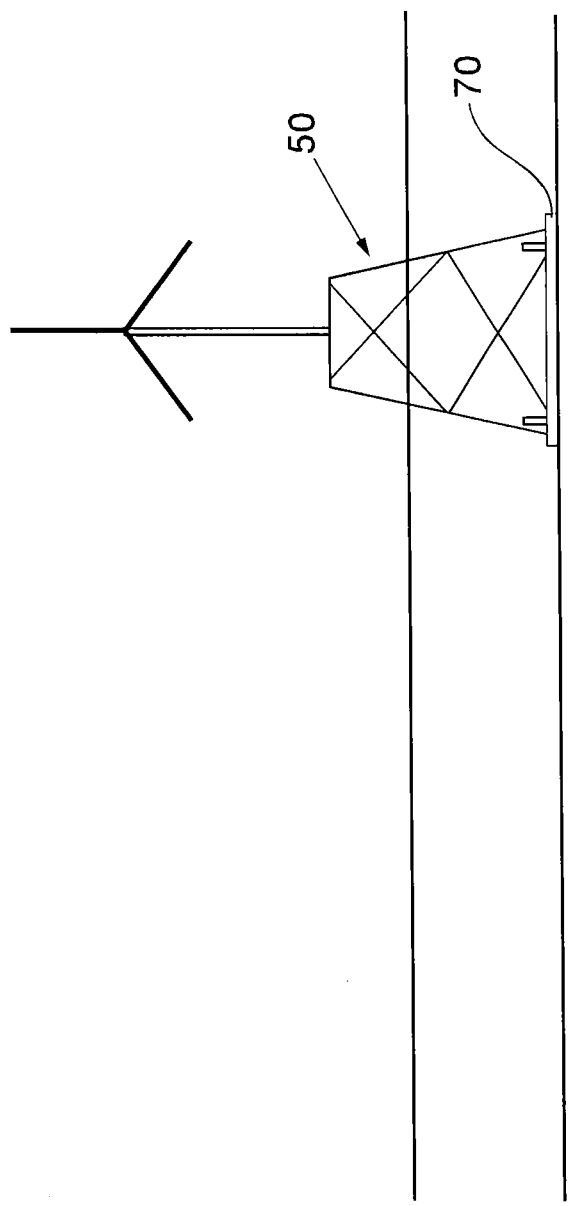
FIG. 5 is a front view of a turbine apparatus after installation.

The cable 40 attached to the turbine apparatus 50 is threaded through the pulley 42 mounted on the template 70 and attached to a winch (not shown) on the vessel 30. The buoyancy is reduced as described above, to a point where the turbine apparatus 50 is only just or slightly buoyant. The turbine apparatus 50 is then pulled down towards the template 70 as shown in FIGS. 3 and 4. The process of removing buoyant liquid 11 from the buoyancy device 10 and pulling the turbine apparatus 50 down towards the template 70 is repeated until the turbine apparatus 50 comes to rest on the template 70 on the seabed 72. The removal of buoyant liquid 11 is controlled such that at any depth, the turbine apparatus 50 is just buoyant, thereby keeping the cable 40 taught, but the force required to pull the turbine apparatus 50 down to a minimum. The remaining buoyant liquid 11 is then pumped out of the buoyancy device 10, such that the turbine apparatus is securely positioned on the seabed (FIG. 4). The buoyancy device 10 is then removed and recovered for reuse, as shown in FIG. 5.

Recovery for maintenance and decommissioning of the turbine apparatus 50 can be done by operating the process described above in reverse. Thus this invention describes processes whereby an offshore wind turbine or a marine tidal turbine or indeed any subsea element can be constructed onshore, towed to an offshore site and lowered into place and then removed for repair or replacement at a later date.

Syntactic buoyancy may be used as the passive buoyancy instead of air as part of the turbine apparatus 50. The combination of the syntactic buoyancy and the buoyant liquid 11 can provide the required buoyancy in the same way as described above using the air and buoyant liquid 11. Such embodiments can function with less buoyant liquid 11, and therefore with smaller tanks.

The buoyant liquid has a density of between 500 and 700 kgs/m$^3$.

FIG. 6 shows a general schematic of the buoyancy device 10. The buoyancy device 10 includes a number of tubes 16. The tubes 16 are normally those used for transporting pressurised gas and are optionally made of high density polyethylene. Each tube 16 is between 30 and 50 meters long and has an inner diameter of between 300 and 1000 millimeters. The tubes 16 may be between 10 and 50 meters long and have a diameter of between 300 millimeters and 1000 millimeters.

The tubes 16 are sealed and have sufficient strength to withstand the hydrostatic head pressure. The tubes 16 are typically filled with air 14 and reduce the amount of buoyant liquid required to provide the necessary buoyancy to float the turbine apparatus 50 (shown in FIGS. 1 to 5). The amount of buoyancy provided by the air 14 is fixed and is not altered during the installation process, rather control of the buoyancy is provided by the buoyant liquid as described herein.

The tubes 16 are sealed at both ends. Each tube 16 is pressurised with air 14 at 500 kPa. In alternative embodiments the air 14 is replaced with nitrogen or another gas. The pressure of the air, nitrogen or other gas may be 1000 kPa. At 500 kPa the tubes 16 can be safely used to provide buoyancy at a depth of 50 meters. At 1000 kPa pressure the tubes 16 can be safely used to provide buoyancy at a depth of 100 meters.

The tubes 16 are held in place and in the arrangement shown in FIG. 6 by hexagonal fittings 18 attached to the tubes 16 at regular intervals along the length of the tubes 16. The hexagonal fittings 18 are arranged to form bulkheads 19 (as shown in FIG. 7a). The tubes 16 are contained in the outer wall 20 of the buoyancy device 10.

The outer wall 20 is sealed, such that fluid communication can only occur via the ports 21 and 22. The outer wall 20 can be made of steel, high density polyethylene or a fabric such as Kevlar® or a combination thereof. The outer wall 20 may be referred to as an envelope or skin.

It is an advantage that the outer wall 20 of the buoyancy device 10 does not need to have a particularly high pressure rating, because the buoyant liquid 11 is effectively incompressible and therefore there is not a pressure imbalance either side of the outer wall 20 when the buoyancy device 10 is submerged. Thus the skin or outer wall of the buoyancy device can be less expensive and lighter. In contrast where gas such as air is on one side of the outer wall 20 of the buoyancy device 10, then a pressure imbalance does or would occur, requiring heavier and more expensive buoyancy devices to withstand such a pressure imbalance.

A header tank 24 is mounted on the top of the buoyancy device 10, such that there is open communication between the inside of the buoyancy device 10, inside the outer wall 20 and header tank 24. The header tank 24 provides an additional water plane when the buoyancy device 10 is sinking.

Clamps (not shown) are attached to the buoyancy device 10 at the hexagonal fittings/bulkheads 18 so that the buoyancy device 10 can be fitted to the wind turbine assembly 50 (as shown in FIGS. 1 to 5).

When the ports 21 and 22 are opened, optionally seawater 62 is pumped into the buoyancy device 10 into the spaces between the tubes 16, displacing the buoyant liquid 11 into the header tank 24 and on into a separate receptacle (not shown) on a ship (also not shown), that is not attached to the buoyancy device 10.

In one embodiment the buoyancy device 10 is 45 m×20 m×3 m but this can clearly vary depending on the weight of the turbine apparatus 50, the specific gravity of the buoyant liquid 11 and other factors.

FIG. 7a is a cross section at A-B (shown on FIG. 6) of the buoyancy device 10. FIG. 7b is a cross section of one of the tubes. The tube 16 is fitted with the hexagonal fitting 18 such that a gap between each of the tubes 16 is created, this gap is between 1 and 10 cm wide. The hexagonal fitting 18 may be between 10 and 100 cm wide. It does not extend the whole length of the tube 16 but is placed at intervals along the tube 16. The tube 16 has a diameter of about 1000 mm. In other embodiments the tube 16 has a diameter of greater than 1000 mm.

The outer wall 20 of the buoyancy device 10 may be a flexible membrane which defines the buoyancy device 10 and holds the buoyant liquid 11 around the tubes 16.

The turbine apparatus 50 can be placed on a powered vessel or a barge (not shown) and transported to the launch site. The barge can then be sunk to allow the turbine apparatus 50 to enter the water 62, without the need for cranes. Depending on the size of the barge, multiple turbine apparatus 50 can be loaded. Once the turbine apparatus 50 has entered the water 62 it will float due to buoyancy device 10 containing the air 14 and buoyant liquid 11. The turbine apparatus 50 can then be moved by tugs such that it is set in position. Thus for such preferred embodiments, this eliminates any requirement for cranes in the installation process.

Two or more buoyancy devices 10 can be joined together to provide buoyancy to very large structures. It is believed that in certain circumstances such buoyancy devices 10 could have an effective density of between 0.22 to 0.15, that is a buoyancy device of 100 M3 would yield between 78 to 85 tonnes of controllable buoyant force.

Improvements and modifications may be made without departing form the scope of the invention and within the scope of the appended claims.

What is claimed is:

1. A method of installing marine equipment, the method comprising:
    (a) providing a marine apparatus, the marine apparatus comprising the marine equipment and a buoyancy device including a first and a second tank, the first tank being a rigid tank and containing air and the second tank containing a buoyant liquid with a buoyancy and having a specific gravity of less than 0.8 g/cm3, and the buoyant liquid being incompressible, the first rigid tank being inside the second tank, the buoyant liquid surrounding the first rigid tank, the air and buoyant liquid being isolated from one another and the second tank having at least one port providing fluid communication with the second tank;
    (b) providing a template on the seabed;
    (c) placing the marine apparatus in water, such that it floats;
    (d) providing one or more flexible elongate members on the marine apparatus and attaching the one or more flexible elongate members to the template;
    (e) removing a portion of the buoyant liquid from the second tank, such that the marine apparatus is less buoyant; and
    (f) guiding the marine apparatus down onto the template using the flexible elongate members.

2. The method of claim 1, further including recovering the buoyant liquid from the second tank to surface for re-use.

3. The method of claim 1, wherein the air in the first tank provides between 70 and 90% of the buoyancy, and the buoyant liquid in the second tank provides the additional buoyancy required to float the marine apparatus.

4. The method of claim 1, wherein the second tank has an opening at the top and an opening at the bottom controlled by valves and wherein to move the buoyant liquid, the top and bottom openings are opened and the buoyant liquid displaced out of the buoyancy device through the action of hydrostatic pressure.

5. The method of claim 1, wherein the buoyant liquid is removed from the second tank by displacing it with water, thus causing the marine apparatus to sink as the buoyancy is reduced.

6. The method of claim 1, wherein the marine equipment can be recovered from the seabed by reversing this operation.

7. The method of claim 1, wherein the buoyancy device is removed after the marine equipment has sunk to the intended position.

8. The method of claim 1, wherein the buoyancy of the marine apparatus is adjusted by changing the amount of buoyant liquid in the second tank.

9. The method of claim 1, wherein guiding the marine apparatus includes pulling the marine apparatus down onto the template using the flexible elongate members.

10. The method of claim 1, wherein the air in the first tank is pressurized between 3 and 12 bar.

11. The method of claim 1, wherein the buoyancy device has a volume of between 100 and 10,000 m$^3$.

12. The method of claim 1, comprising ten first tanks.

13. The method of claim 1, wherein the air is sealed in the first tank.

* * * * *